US009007312B2

(12) United States Patent
Kim et al.

(10) Patent No.: US 9,007,312 B2
(45) Date of Patent: Apr. 14, 2015

(54) DEVICE AND METHOD FOR TRANSMITTING DATA IN PORTABLE TERMINAL (75) Inventors: Tae-Hoon Kim, Gyeongsangbuk-do (KR); Man-Gun Hur, Daegu (KR); Jae-Woong Han, Gyeongsangbuk-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 158 days.

(21) Appl. No.: 13/342,308

(22) Filed: Jan. 3, 2012

(65) Prior Publication Data

US 2012/0169638 A1 Jul. 5, 2012

(30) Foreign Application Priority Data

Jan. 3, 2011 (KR) ........................ 10-2011-0000304

(51) Int. Cl.
*G06F 3/041* (2006.01)
*G06F 1/16* (2006.01)
*G06F 3/0486* (2013.01)
*G06F 3/0488* (2013.01)
*H04L 29/00* (2006.01)
*H04L 29/06* (2006.01)
*H04W 12/06* (2009.01)
*H04W 88/02* (2009.01)

(52) U.S. Cl.
CPC ............ *G06F 1/1698* (2013.01); *G06F 1/1643* (2013.01); *G06F 3/0486* (2013.01); *G06F 3/04883* (2013.01); *H04L 29/00* (2013.01); *H04L 63/08* (2013.01); *H04W 12/06* (2013.01); *H04W 88/02* (2013.01)

(58) Field of Classification Search
USPC ........................................................ 345/173
See application file for complete search history.

(56) References Cited

U.S. PATENT DOCUMENTS

| 6,545,669 | B1 * | 4/2003 | Kinawi et al. ................. 345/173 |
| 8,077,157 | B2 * | 12/2011 | Sengupta et al. ............. 345/173 |
| 8,364,963 | B2 * | 1/2013 | Lind et al. ..................... 713/171 |
| 2007/0124503 | A1 * | 5/2007 | Ramos et al. ................. 709/248 |
| 2007/0264976 | A1 * | 11/2007 | Lessing et al. ............. 455/414.1 |
| 2009/0140986 | A1 * | 6/2009 | Karkkainen et al. .......... 345/173 |
| 2011/0279388 | A1 * | 11/2011 | Jung et al. ..................... 345/173 |

FOREIGN PATENT DOCUMENTS

KR 102010034592 A 4/2010

* cited by examiner

*Primary Examiner* — Kumar Patel
*Assistant Examiner* — Amy C Onyekaba
(74) *Attorney, Agent, or Firm* — Cha & Reiter, LLC (57) ABSTRACT A device and method for transmitting data can conveniently perform data transmission between two portable terminals. The device preferably includes a first portable terminal transmitting data on which a drag operation has occurred to a second portable terminal when the second portable terminal is coupled to the first portable terminal using a time and a moving speed of the drag operation when the drag operation occurs from the first terminal to the second portable terminal. The second portable terminal receives the data from the first portable terminal using the time and the moving speed of the drag operation when the drag operation occurs from the first portable terminal to the second portable terminal coupled to the first portable terminal through near field communication.

20 Claims, 5 Drawing Sheets

DEVICE AND METHOD FOR TRANSMITTING DATA IN PORTABLE TERMINAL

CLAIM OF PRIORITY

This application claims priority under 35 U.S.C. §119(a) from Korean Patent application serial no. 10-2011-0000304, entitled "Device And Method For Transmitting Data In Portable Terminal" filed in the Korean Intellectual Property Office on Jan. 3, 2011, the contents of which are hereby incorporated by reference in its entirety.

BACKGROUND OF THE INVENTION

1. Field of the Invention

The present invention generally relates to a device and method for transmitting data by portable terminals. More particularly, the present invention relates to a device and method for transmitting data for performing data transmission between two portable terminals using near field communication.

2. Description of the Related Art

A portable terminal is high-tech wireless communication equipment which can be moved almost anywhere because it is carried by a person. When in motion, the portable terminal passes through a communication path which is set through monitoring, controlling, and switching by a mobile switching station to remain functional as the portable terminal is moved within a service area that is formed by a corresponding base station of a system to which the portable terminal has been subscribed and registered. The portable terminal communicates with a desired party through immediate wireless connection thereto at any time and any place.

Various additional services are provided to the portable terminal, and such additional services can be categorized into additional services which are developed and provided by mobile communication service providers and additional services which are developed by portable terminal manufacturers and built into the device.

The additional services which are developed by the portable terminal manufacturers and built into the device may include, for example, a camera, Bluetooth, wireless LAN, MP3 player, radio receiver, game, electronic calculator, calendar, time piece, destination bell setting, and the like, and the additional services which are developed and provided by the mobile communication service providers may include text messaging, video messaging, on-line gaming, wireless Internet connection, originator confirmation, and the like. Over time, new functions have been continuously developed and added as the additional services.

Among the above-described additional services, a near field communication function, such as Bluetooth or the like, can be used for data transmission/reception.

In order to perform the near field communication function such as the Bluetooth or the like, neighboring portable terminals that are capable of performing near field communication are searched for and displayed in the form of a search list, and a communication channel for data transmission with a portable terminal selected in the search list is configured only after passing through an authentication process such as inputting a password, etc.

As described above, in order to perform near field communication between portable terminals, it is required to pass through a complicated procedure. Also, a desired portable phone may not be found in the search list, and it is required to input a password individually which causes inconvenience in use.

SUMMARY OF THE INVENTION

Accordingly, the present invention provides an apparatus and method for transmitting data, which can be performed conveniently by two portable terminals.

Also, the present invention provides an apparatus and method for transmitting data, which can conveniently transmit data without any complicated mutual authentication process between two portable terminals.

Also, the present invention provides an apparatus and method for transmitting data, which can conveniently perform data transmission between two portable terminals in response to a drag operation.

In accordance with an exemplary aspect of the present invention, there is provided a device for transmitting data, which preferably includes a first portable terminal transmitting data on which a drag operation has occurred to a second portable terminal using a time and a moving speed of the drag operation when the drag operation occurs from the first terminal to the second portable terminal connected to the first portable terminal; and the second portable terminal receiving the data from the first portable terminal using the time and the moving speed of the drag operation when the drag operation occurs from the first portable terminal to the second portable terminal connected to the first portable terminal.

In accordance with another exemplary aspect of the present invention, there is provided a method for transmitting data, which preferably includes: extracting a time and a moving speed of a drag operation, by each of a first portable terminal and a second portable terminal, when the drag operation occurs from the first portable terminal to the second portable terminal connected to the first portable terminal; and transmitting data, on which the drag operation occurs, to the second portable terminal by the first portable terminal by using the time and the moving speed of the drag operation.

According to the present invention, the apparatus and method for transmitting data in a portable terminal is provided to conveniently transmit data only through a drag operation without any complicated mutual authentication process between two portable terminals.

BRIEF DESCRIPTION OF THE DRAWINGS

The above and other exemplary aspects, features and advantages of the present invention will become more apparent from the following detailed description taken in conjunction with the accompanying drawings, in which.

DETAILED DESCRIPTION

Hereinafter, exemplary embodiments of the present invention will be described with reference to the accompanying drawings. In the following description, the same elements will be designated by the same reference numerals although they are shown in different drawings.

Figure 1:
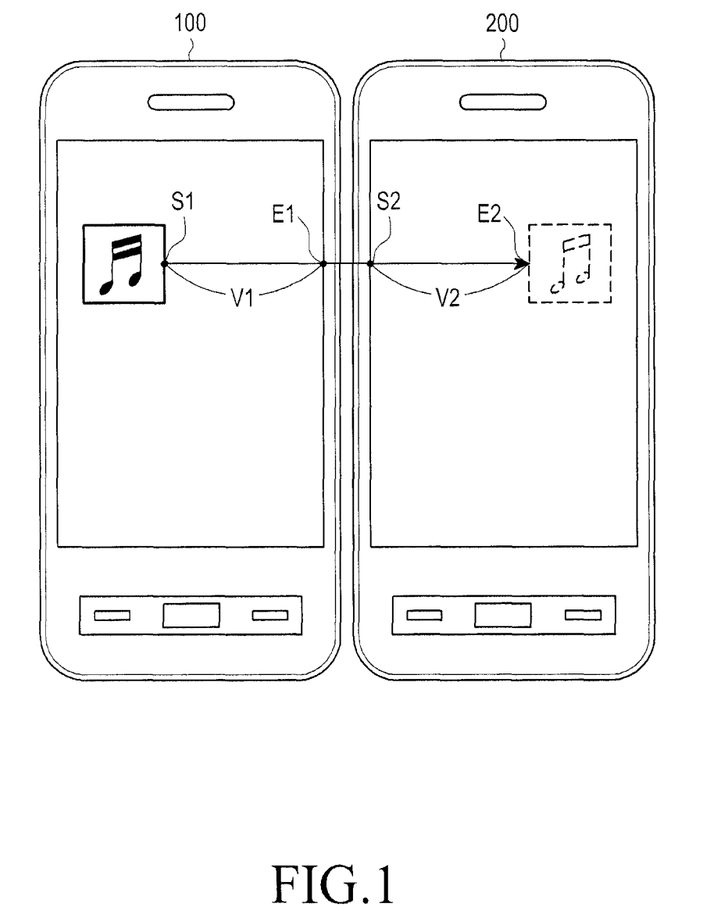
FIG. 1 is a diagram illustrating data transmission between a first portable terminal and a second portable terminal according to an exemplary embodiment of the present invention.

FIG. 1 is a diagram illustrating data transmission between a first portable terminal and a second portable terminal according to an exemplary embodiment of the present invention. The first portable terminal is a sending side terminal that requests communication connection from the second portable terminal and transmits data thereto, and the second portable terminal is a reception side terminal that receives the data according to the communication request of the first portable terminal.

Referring now to FIG. 1, in a near field communication mode, if a drag operation occurs from the first portable terminal 100 to the second portable terminal 200 in a state where the first portable terminal 100 comes in contact with the second portable terminal 200, the first portable terminal 100 transmits data on which the drag operation has occurred to the second portable terminal 200 using a time and a moving speed according to the drag operation.

In the near field communication mode, if the drag operation occurs from the first portable terminal 100 to the second portable terminal 200 in a state where the second portable terminal 200 comes in contact with the first portable terminal 100, the second portable terminal 200 receives the data from the first portable terminal 100 using the time and the moving speed according to the drag operation.

An exemplary configuration of the first portable terminal 100 and the second portable terminal 200 as discussed above will now be described with reference to FIG. 2.

Figure 2:
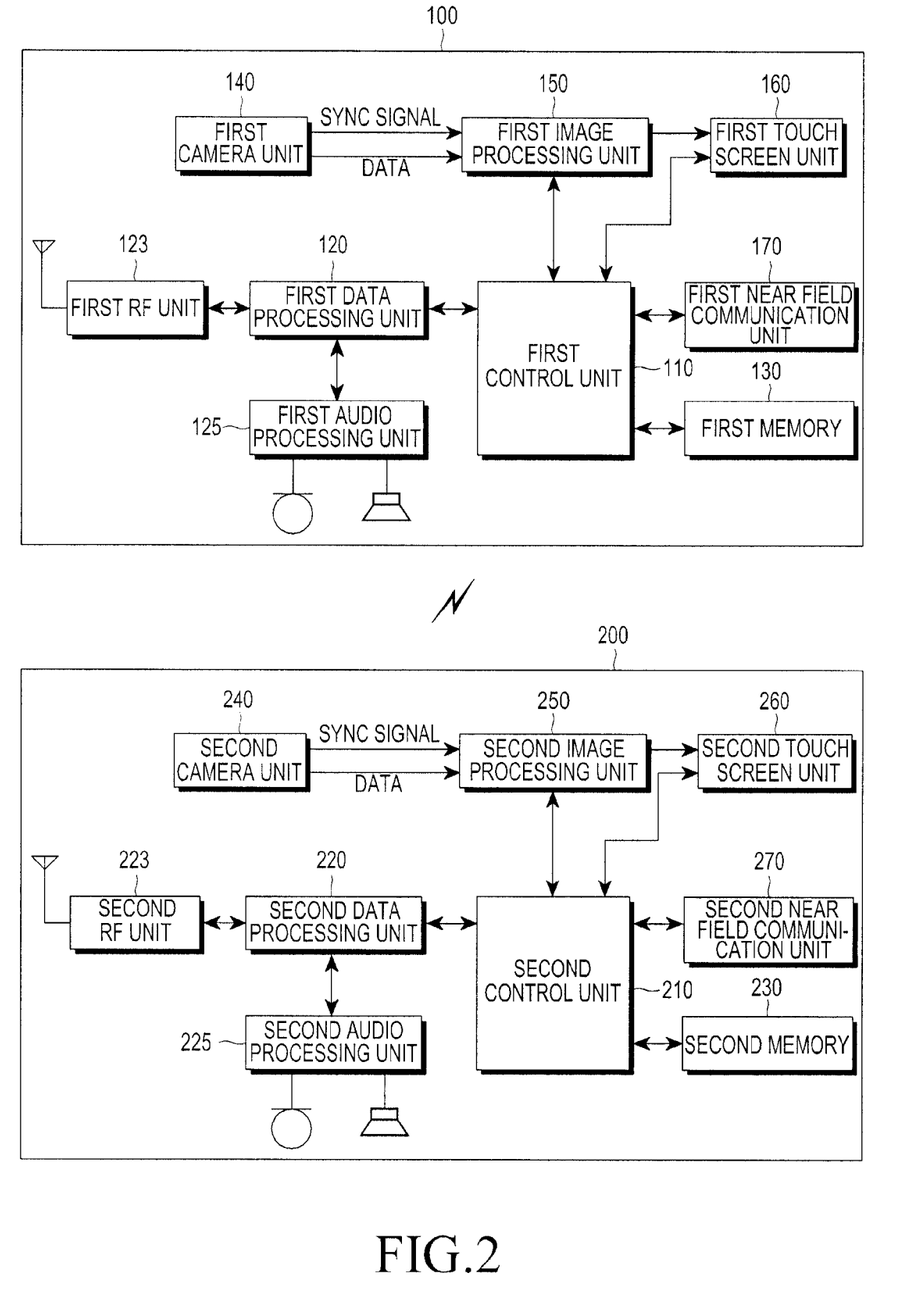
FIG. 2 is a diagram illustrating the configuration of a first portable terminal and a second portable terminal according to an exemplary embodiment of the present invention.

FIG. 2 is a diagram illustrating exemplary configuration of the first portable terminal and the second portable terminal according to an exemplary embodiment of the present invention.

Referring now to FIG. 2, the configuration of the first portable terminal 100 will be described. A first RF unit 123 performs a wireless communication function of the portable terminal. The first RF unit 123 preferably includes an RF transmitter up-converting and amplifying the frequency of a transmitted signal, an RF receiver low-noise-amplifying a received signal and down-converting the frequency of the received signal, and the like. An artisan should appreciate that an RF transceiver including the functionality of the transmitter and receiver can be provided. A first data processing unit 120 includes a transmitter encoding and modulating the transmitted data, a receiver demodulating and decoding the received signal, and the like. In other words, the first data processing unit 120 may be composed of a modem and a codec. In this example, the codec may be provided with a data codec that processes packet data or the like, and an audio codec that processes an audio signal such as voice. A first audio processing unit 125 reproduces the received audio signal output from the audio codec of the first data processing unit 120 or transmits the transmitted audio signal generated from a microphone to the audio codec of the first data processing unit 120.

The first memory 130 may comprise a program memory and a data memory. The program memory is a non-transitory machine readable medium that may store programs for controlling the general operation of the portable terminal and programs for transmitting data of the first portable terminal 100 to the second portable terminal 200 after performing an authentication process with the second portable terminal 200 through authentication information that is generated through the drag operation.

A first control unit 110, which preferably includes a microprocessor, controls the entire operation of the first portable terminal 100.

According to an exemplary embodiment of the present invention, if a drag operation for specified data that is being displayed on a first touch screen 160 is performed, the first control unit 110 extracts the time and the moving speed of the drag operation which are generated according to the drag operation.

The extracted time and moving speed of the drag operation along the first portable terminal 100, as illustrated in FIG. 1, preferably includes a start time S1, an end time E1, and a moving speed V1 from the time point of the start time S1 to the time point of the end time E1. The start time S1 represents a time in which the data is touched for the drag operation on the first touch screen unit 160 of the first portable terminal 100, and the end time E1 represents a time in which the drag operation ends on the first touch screen unit 160 of the first portable terminal.

According to yet another exemplary embodiment of the present invention, the first control unit 110 transmits authentication information that preferably includes the end time E1 and the moving speed V1 from the time point of the start time S1 to the time point of the end time E1 to all devices including the second portable terminal 200 that can perform the searched communication together with the switching of the near field communication mode.

According to yet another exemplary embodiment of the present invention, if an authentication completion is received from the second portable terminal 200 which has the authentication information that coincides with the transmitted authentication information, the first control unit 110 operates to transmit the data on which the drag operation has been performed to the second portable terminal 200 connected to communicate with the first portable terminal through a first near field communication unit 170.

According to still another exemplary embodiment of the present invention, if two touches that are spaced apart by a predetermined distance from each other occur simultaneously or substantially simultaneously for the data being displayed on the first touch screen unit 160, the first control unit 110 controls the first portable terminal to be automatically switched to the near field communication mode.

According to yet another exemplary embodiment of the present invention, the first control unit 110 performs the authentication process with the second portable terminal using the time and the moving speed of the drag operation that occurs through the drag operation that is performed by the two touches as described above, and operates to transmit the data of the first portable terminal 100 to the second portable terminal 200 connected to communicate with the first portable terminal through the authentication process. The authentication process performed between the first portable terminal 100 and the second portable terminal 200 is preferably the same as that as described above.

The first near field communication unit 170 transmits the data of the first portable terminal 100 to the second portable terminal 200 through a second near field communication unit 270 of the second portable terminal 200, or receives the data from the second portable terminal 200.

With continued reference to FIG. 2, a first camera unit 140 preferably includes a camera sensor capturing image data and converting a captured optical signal into an electric signal, and a signal processing unit converts an analog image signal captured by the camera sensor into digital data. Here, it is assumed that the camera sensor is, for example, a charge-coupled device CCD or complementary metal oxide semiconductor (CMOS) sensor, and the signal processing unit can be implemented by a Digital Signal Processor (DSP). Also, the camera sensor and the signal processing unit may be implemented integrally or separately.

A first image processing unit 150 performs Image Signal Processing (ISP) for displaying the image signal output from the first camera unit 140 on the first touch screen unit 160, and the ISP preferably includes functions of gamma correction, interpolation, spatial change, image effect, image scale, auto-white balance (AWB), automatic exposure (AE), auto-focus (AF), frame tracking, etc., and the like. Accordingly, the first image processing unit 150 processes the image signal output from the first camera unit 140 in a frame unit, and outputs the frame image data to match the characteristic and the size of the first touch screen unit 160. Also, the first image processing unit 150 is provided with an image codec, and compresses the frame image data that is displayed on the first touch screen 160 in a predetermined method or decompresses the compressed frame image data to the original frame image data. Here, the image codec may comprise, for example, a JPEG codec, an MPEG4 codec, a Wavelet codec, or the like. It is assumed that the first image processing unit 150 has an On Screen Display (OSD) function, and the first image processing unit 150 can output OSD data according to the screen size under the control of the first control unit 110.

The first touch screen unit 160 may operate as a display unit and an input unit. When the first touch screen unit 160 operates as a display unit, it displays an image signal output from the first image processing unit 150 on the screen and displays user data output from the first control unit 110.

Also, when the first touch screen unit 160 operates as an input unit, it displays keys for inputting numeral and character information and function keys for setting various kinds of functions.

Still referring to FIG. 2, the configuration of the second portable terminal 200 will be described. A second memory 230 may include a program memory and a data memory. The program memory may store programs for controlling the general operation of the portable terminal and programs for performing an authentication process with the first portable terminal through authentication information generated through the drag operation and receiving data from the first portable terminal 100.

A second control unit 210 controls the entire operation of the second portable terminal 200.

According to an exemplary embodiment of the present invention, if a drag operation occurs on a second touch screen 260 in the near field communication mode, the second control unit 210 extracts the time and the moving speed of the drag operation which are generated according to the drag operation.

The extracted time and moving speed of the drag operation along the second portable terminal 100, as illustrated in FIG. 1, includes a start time S2, an end time E2, and a moving speed V2 from the time point of the start time S2 to the time point of the end time E2. The start time S2 represents a time in which the data is touched for the drag operation on the second touch screen unit 260 of the second portable terminal 200, and the end time E2 represents a time in which the drag operation is ended on the second touch screen unit 260 of the second portable terminal.

According to an exemplary embodiment of the present invention, the second control unit 210 stores authentication information that includes the start time S2 and the moving speed V2 from the time point of the drag operation start time S2 to the time point of the drag operation end time E2 in the second memory 230.

According to an exemplary embodiment of the present invention, if the authentication information that includes the end time E1 and the moving speed V1 from the time point of the drag operation start time S1 to the time point of the drag operation end time E1 is received from the first portable terminal 100 and the drag operation start time S2 coincides with the drag operation end time E1, the second control unit 210 completes the authentication with the first portable terminal, and transmits the authentication completion to the first portable terminal 100 through the second near field communication unit 270.

Also, according to an exemplary embodiment of the present invention, if the authentication information that includes the end time E1 and the moving speed V1 from the time point of the drag operation start time S1 to the time point of the drag operation end time E1 is received from the first portable terminal 100, and the drag operation start time S2 coincides with the drag operation end time E1 and the moving speed V2 coincides with the moving speed V1 included in the authentication information of the first portable terminal, the second control unit 210 completes the authentication with the first portable terminal, and transmits the authentication completion to the first portable terminal 100 through the second near field communication unit 270.

Also, according to an exemplary embodiment of the present invention, the second control unit 210 operates to receive the data from the first portable terminal 100 connected to communicate via first near field communication unit 170 with the second portable terminal through the second near field communication unit 270 after the authentication completion is transmitted.

According to another exemplary embodiment of the present invention, if two touches, which are spaced apart by a predetermined distance from each other, occur simultaneously on the second touch screen unit 260, the second control unit 210 controls the second portable terminal 200 to be automatically switched to the near field communication mode.

According to another exemplary embodiment of the present invention, the second control unit 210 performs the authentication process with the first portable terminal 100 using the time and the moving speed of the drag operation that occurs through the drag operation performed by the two touches as described above, and operates to receive the data from the first portable terminal 100 connected to communicate with the second portable terminal 200 through the authentication process. The authentication process between the first portable terminal 100 and the second portable terminal 200 is preferably the same as that as described above.

The second near field communication unit 270 transmits the data of the second portable terminal 200 to the first portable terminal 100 through the first near field communication unit 170 of the first portable terminal 100, or receives the data of the first portable terminal 100.

In the second portable terminal 200, a second camera unit 240, a second image processing unit 250, a second touch screen unit 260, an RF unit 223, a second data processing unit 220, and a second audio processing unit 225 preferably perform the same operations as the first camera unit 140, the first image processing unit 150, the first touch screen unit 160, the first RF unit 123, the first data processing unit 120 and the first audio processing unit 125 of the first portable terminal 100, respectively, and thus the explanation thereof will be omitted.

A process of transmitting data between the first portable terminal and the second portable terminal as described above will now be described in detail with reference to FIGS. 3, 4A and 4B.

Figure 3:
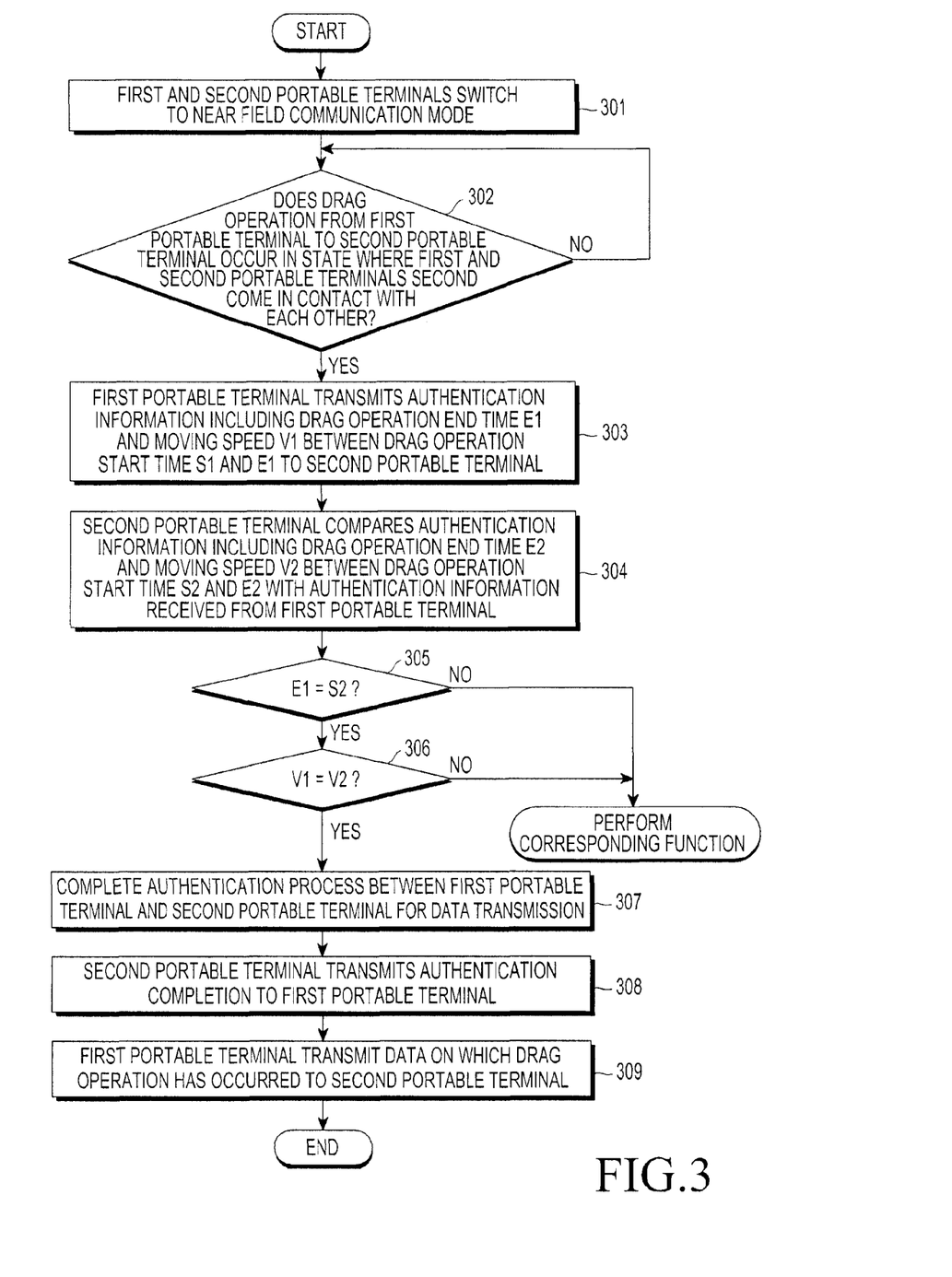
FIG. 3 is a flowchart illustrating a data transmission process between a first portable terminal and a second portable terminal according to an exemplary embodiment of the present invention.

FIG. 3 is a flowchart illustrating exemplary operation of a data transmission process between the first portable terminal and the second portable terminal according to an exemplary embodiment of the present invention. In FIG. 3, it is exemplified that a drag operation through one touch operation is performed.

Hereinafter, an exemplary embodiment of the present invention will be described in detail with reference to the portable terminals 100,200 shown in FIGS. 1 and 2.

Referring now to FIG. 3, at step 301, according to a user's selection, the first control unit 110 switches the first portable terminal 100 to the near field communication mode, and the second control unit 210 switches the second portable terminal 200 to the near field communication mode.

At this time, according to the user's request of the first portable terminal, the first control unit 110 searches for peripheral devices that can communicate with the first portable terminal, and determines the peripheral devices that include the second portable terminal 200 that can communicate with the first portable terminal 100.

Then at step 302, if a drag operation occurs by the user from the first touch screen unit 160 of the first portable terminal to the second touch screen unit 260 of the second portable terminal 200 in a state where the first portable terminal 100 and the second portable terminal 200 are coupled to each other so as to come in contact or substantially in contact with each other and are arranged in parallel with each other as illustrated in FIG. 1, the first control unit 110 and the second control unit 210 sense the drag operation in step 302, and extract the drag operation time and the moving speed according to the drag operation. In the present invention, the end time E1 of the first touch screen unit must be consistent with the start time S1 of the second touch screen unit, so two portable terminal are arranged within the distance to determine the coincidence of the two times.

The first control unit 110 extracts the drag operation time and the moving speed according to the drag operation occurring on the first touch screen unit 160 of the first portable terminal 100, that is, the drag operation start time S1, the end time E1, and the moving speed V1 from the time point of the start time S1 to the time point of the end time E1.

Also, the second control unit 210 extracts the drag operation time and the moving speed according to the drag operation occurring on the second touch screen unit 260 of the second portable terminal 200, that is, the drag operation start time S2, the end time E2, and the moving speed V2 from the time point of the start time S2 to the time point of the end time E2, and stores the start time S2 and the moving speed V2 as the authentication information.

In step 303, the first control unit 110 transmits the authentication information that includes the end time E1 and the moving speed V1 to all the searched peripheral devices including the second portable terminal 200.

In step 304, the second control unit 210 compares the authentication information received from the first portable terminal 100 with the authentication information extracted from the second portable terminal.

In step 305, if the end time E1 coincides with the start time S2, the second control unit 210 senses this coincidence of end time and start time, and completes a first authentication process with the first portable terminal 100. Note that when the drag operation is occurred in the first touch screen unit of the first portable terminal to the second touch screen unit of the second portable terminal, the end time E1 of the drag operation in the first touch screen unit cannot completely coincide with the start time S2 of the drag operation in the second touch screen unit.

Since the first portable terminal 100 and the second portable terminal 200 come in contact with each other and are arranged in parallel with each other, there is almost no error between the drag operation end time E1 occurring in the first portable terminal 100 and the drag operation start time S2 successively occurring in the second portable terminal 200, and thus the coinciding process of the two times can be used as the authentication process.

In step 307, if the moving speed V1 coincides with the moving speed V2, the second control unit 210 senses this coincidence of speed, and completes the authentication process for performing the communication with the first portable terminal 200 in step 307 by completing a second authentication process with the first portable terminal 100.

Since a successive drag operation occurs from the first portable terminal 100 to the second portable terminal 200 in a state where the first portable terminal 100 and the second portable terminal 200 come in contact with each other and are arranged in parallel with each other, the drag operation speeds generated in the respective portable terminals can coincide with each other. Accordingly, the coinciding process of the two speeds V1, V2 can be used as the authentication process.

If at step 308, the authentication process is completed, the second control unit 210 transmits the authentication completion to the first portable terminal 100.

Although the first portable terminal 100 has transmitted the authentication information to all the searched peripheral devices, the peripheral device having the authentication information that coincides with that of the first portable terminal 100 is only the second portable terminal 200, and thus only the second portable terminal 200 can transmit the authentication completion to the first portable terminal 100.

Accordingly, if the authentication completion is received from the second portable terminal 200, the first control unit 110 connects to the second portable terminal 200 for communication, and then at step 309 the first portable terminal 100 transmits the data on which the drag operation has occurred to the second portable terminal 200 through the first near field communication unit 170.

If the data is received from the first portable terminal 100 connected for communication, the second control unit 210 senses this attribute of the data, and displays the received data on the second touch screen unit 260.

Figure 4A:
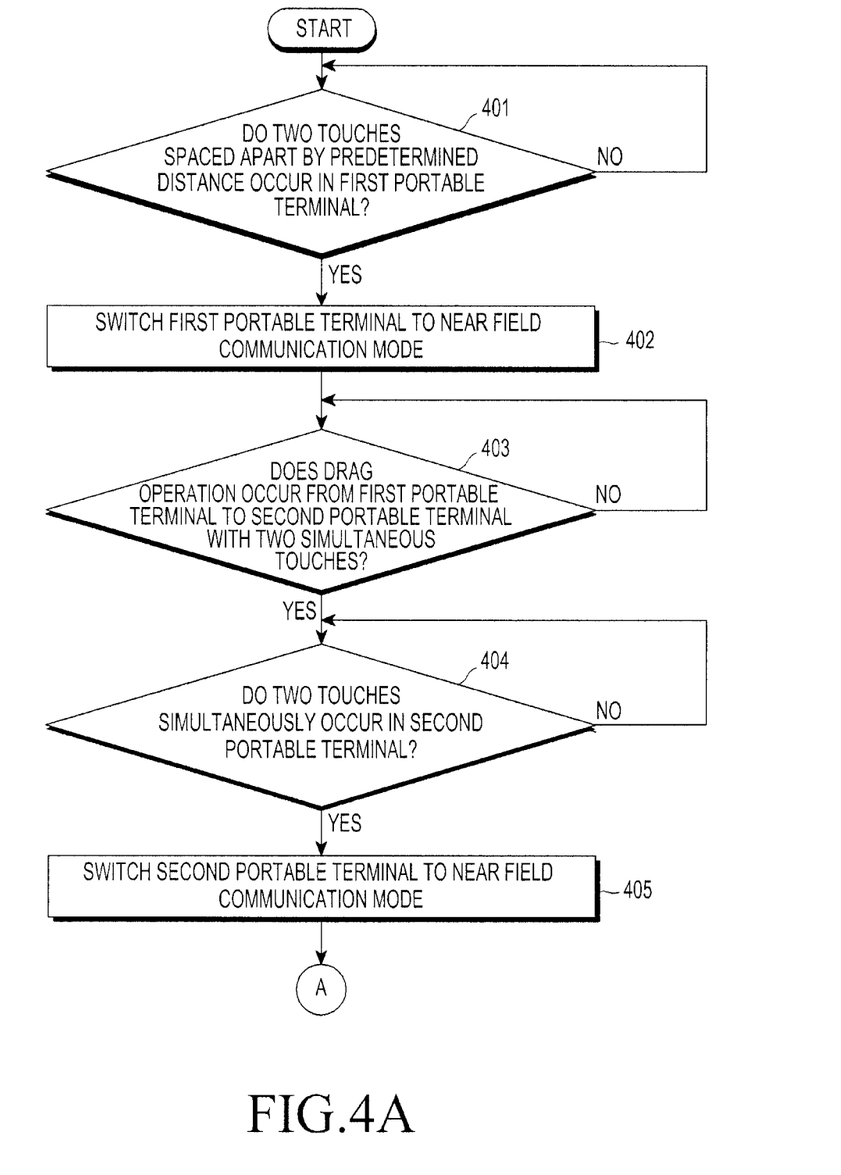
FIGS. 4A and 4B are flowcharts illustrating a data transmission process between a first portable terminal and a second portable terminal according to another exemplary embodiment of the present invention.
Figure 4B:
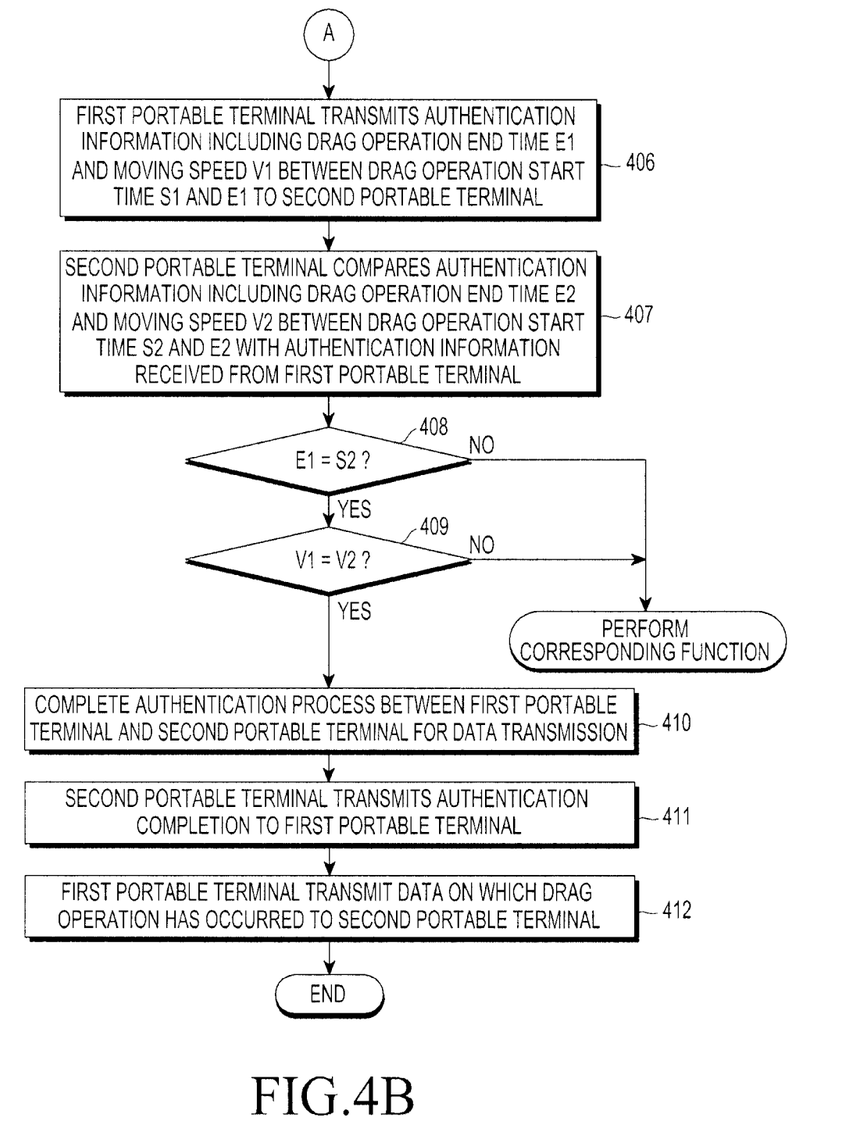

FIGS. 4A and 4B are flowcharts illustrating an exemplary data transmission process between the first portable terminal and the second portable terminal according to another exemplary embodiment of the present invention. In FIGS. 4A and 4B, it is exemplified that a drag operation is performed using two touch operations.

Hereinafter, an exemplary embodiment of the present invention will be described in detail with reference to FIGS. 1 and 2.

Referring now to FIG. 4A, if two touches which are spaced apart by a predetermined distance from each other occur simultaneously on the first touch screen unit 160 of the first portable terminal in a state where the first portable terminal 100 and the second portable terminal 200 come in contact with each other and are arranged in parallel with each other as illustrated in FIG. 1, the first control unit 110 senses this in step 401, and automatically switches the first portable terminal 110 to the near field communication mode in step 402.

If the drag operation is performed through the two simultaneous touches spaced apart by a predetermined distance from the first portable terminal 100 to the second portable terminal 200 connected to the first portable terminal 100, the first control unit 110 and the second control unit 210 sense this connection in step 403, respectively, and extracts the drag operation time and the moving speed according to the drag operation.

If the drag operation occurs on the second touch screen unit 260 of the second portable terminal 200 while the drag operation is performed through the two simultaneous touches spaced apart by a predetermined distance from the first portable terminal 100 to the second portable terminal 200, then at step 404 the second control unit 210 senses this simultaneous touch, and at step 405 switches the second portable terminal 200 to the near field communication mode.

Thereafter, steps 406 to 412 of FIG. 4B are performed preferably in the same manner as the steps 303 to 309 of FIG. 3. However, in the data transmission operation through the authentication process between the first portable terminal 100 and the second portable terminal 200, since only a difference is that a drag operation through one touch operation is performed in the steps 303 to 309, and a drag operation through two simultaneous touches spaced apart by a predetermine distance is performed in the steps 406 to 412, the explanation thereof will be omitted.

In the exemplary embodiments of the present invention, although it is exemplified that data transmission is performed between portable terminals through a drag operation, the data can be transmitted between a plurality of terminals through the above-described operation.

For example, in the case of transmitting data of the first portable terminal to the second to fifth portable terminals, the first portable terminal to the fifth portable terminal are arranged to come in contact with one another in order. If a drag operation from the first portable terminal to the fifth portable terminal is performed, the first portable terminal transmits data to the second portable terminal through the operations as illustrated in FIGS. 3, 4A and 4B, and releases the near field communication mode of the first portable terminal. Thereafter, the second portable terminal transmits data to the third portable terminal through the operation as illustrated in FIG. 3 or 4A and 4B, and releases the near field communication mode of the second portable terminal. By repeating the above-described operation, the data of the first portable terminal can be transmitted to the second portable terminal to the fifth portable terminal.

The above-described methods according to the present invention can be realized in hardware or as software or computer code that can be stored in a non-transitory recording medium such as a CD ROM, a RAM, thumbnail drive, a floppy disk, a flash storage, a hard disk, or a magneto-optical disk or downloaded over a network and stored in storage, so that the methods described herein can be executed by such software using a general purpose computer, special computer, microprocessor, special processor, or in a programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the operation and configuration of the method and apparatus for controlling a home network system using a mobile terminal have been shown and described with reference to certain exemplary embodiments thereof, it will be understood by those skilled in the art that various changes in form and details may be made therein without departing from the spirit and scope of the invention as defined by the appended claims.

What is claimed is:

1. A portable terminal comprising:
   a touchscreen unit;
   a communication unit; and
   a controller configured to:
      detect as authentication information an operation time and a moving speed of a drag operation via the touchscreen unit,
      directly broadcast via the communication unit the detected authentication information to a counterpart portable terminal, and
      transmit data designated by the drag operation to the counterpart portable terminal if an indication is received directly from the counterpart portable terminal via the communication unit that the detected authentication information matches with a counterpart operation time and a counterpart moving speed of counterpart authentication information generated by continuation of the drag operation on a counterpart touchscreen unit of the counterpart portable terminal.

2. The portable terminal of claim 1, wherein the controller is further configured to detect the authentication information when the portable terminal is in a near field communication mode.

3. The portable terminal of claim 1, wherein the controller is further configured to detect as the authentication information a moving speed from a drag operation start time to a drag operation end time for the drag operation detected on the touchscreen,
   wherein the drag operation start time comprises a time at which the data is initially designated by the drag operation on the touchscreen unit, and the drag operation end time comprises a time in which the drag operation is released from the touchscreen unit.

4. The portable terminal of claim 1, wherein the controller is further configured to:
   switch to a near field communication mode if two touch inputs are simultaneously received on the touchscreen unit spaced apart by a predetermined distance, the touch inputs disposed over an icon displayed on the touchscreen unit representing the data,
   wherein the drag operation is executed via the two touch inputs.

5. A portable terminal comprising:
   a touchscreen;
   a communication unit; and
   a controller configured to:
      detect and store as authentication information an operation time and a moving speed of a drag operation via the touchscreen,
      directly receive via the communication unit a counterpart authentication information from a counterpart portable terminal including a counterpart operation time and a counterpart moving speed of the drag operation,
      compare the detected authentication information with the received counterpart authentication information,
      directly transmit an indication authenticating a connection to the counterpart portable terminal when the detected authentication information matches with the received counterpart authentication information, and when the connection is authenticated, receive data from the counterpart portable terminal.

6. The portable terminal of claim 5, wherein the controller is further configured to detects the authentication information when the portable terminal is in a near field communication mode.

7. The portable terminal of claim 5, wherein the controller is further configured to detect and store as the authentication information a moving speed V2 from a drag operation start time S2 to a drag operation end time E2 for the drag operation occurring on the touchscreen, a wherein the drag operation start time S2 comprises a time at which the data is initially designated by the drag operation on the touchscreen, and the drag operation end time E2 comprises a time in which the drag operation is released from the touchscreen.

8. The portable terminal of claim 7, wherein the controller is further configured to transmit the indicator authenticating connection to the counterpart portable terminal when the drag operation start time S2 matches a drag operation end time E1 included in the received counterpart authentication information.

9. The portable terminal of claim 7, wherein the controller is further configured to transmit the indicator authenticating connection to the counterpart portable terminal when the drag operation start time S2 included in the authentication information matches with a drag operation end time E1 of the counterpart authentication information and the moving speed V2 included in the authentication information matches the moving speed V1 included in the counterpart authentication information.

10. The portable terminal of claim 5, wherein the controller is further configured to switch the portable terminal to a near field communication mode when two touch inputs are simultaneously received on the touchscreen spaced apart by a predetermined distance the touch inputs disposed over an icon displayed on the touchscreen representing the data,
wherein the drag operation is executed via the two touch inputs.

11. A method of transmitting data for a portable terminal, the method comprising:
detecting as authentication information an operation time and a moving speed of a drag operation via a touchscreen of the portable terminal;
directly broadcasting the detected authentication information via a communication unit to a counterpart portable terminal;
authenticating a connection to the counterpart portable terminal via a processor when an indicator is directly received from the counterpart portable terminal via the communication unit that the authentication information that matches a counterpart operation time and counterpart moving speed of a counterpart authentication information generated by continuation of the drag operation on a counterpart touchscreen unit of the counterpart portable terminal; and
when the connection is authenticated, transmitting data designated by the drag operation to the counterpart portable terminal.

12. The method of claim 11, wherein the authentication information is detected when the portable terminal is in a near field communication mode.

13. The method of claim 11, further comprising:
detecting as the authentication information a moving speed V1 from a drag operation start time S1 to a drag operation end time E1 for the drag operation detected on the touchscreen,
wherein the drag operation start time S1 comprises a time at which the data is initially designated by the drag operation on the touchscreen and the drag operation end time E1 comprises a time in which the drag operation is released from the touchscreen.

14. The method of claim 11, further comprising:
switching the portable terminal to a near field communication mode when two touch inputs are simultaneously received on the touchscreen unit spaced apart by a predetermined distance, the touch inputs disposed over an icon displayed on the touchscreen unit representing the data; and
wherein the drag operation is executed by the two touch inputs spaced apart by the predetermined distance.

15. A method of transmitting data for a portable terminal, the method comprising:
detecting and storing as authentication information an operation time and a moving speed of a drag operation via a touchscreen;
directly receiving via a communication unit counterpart authentication information from a counterpart portable terminal including a counterpart operation time and counterpart moving speed generated by the drag operation;
comparing the detected authentication information with the received counterpart authentication information;
directly transmitting an indication authenticating a connection to the counterpart portable terminal when the authentication information matches with the received counterpart authentication information; and
when the connection is authenticated, receiving data from the counterpart portable terminal.

16. The method of claim 15, wherein the authentication information is detected when the portable terminal is in a near field communication mode.

17. The method of claim 15, further comprising:
detecting and storing as the authentication information a moving speed V2 from a drag operation start time S2 to a drag operation end time E2 for the drag operation occurring on the touchscreen, and
wherein the drag operation start time S2 comprises a time in at which the data is initially designated by the drag operation on the touchscreen and the drag operation end time E2 comprises a time in which the drag operation is released from the touchscreen.

18. The method of claim 15, further comprising:
transmitting the indicator authenticating connection to the counterpart portable terminal when a drag operation start time S2 included in the authentication information matches with a drag operation end time E1 included in the received counterpart authentication information.

19. The method of claim 15, further comprising:
transmitting the indicator authenticating the connection to the counterpart portable terminal when a drag operation start time S2 included in the authentication information matches with a drag operation end time E1 of the counterpart authentication information and the moving speed V2 included in the authentication information matches with the moving speed V1 included in the counterpart authentication information.

20. The method of claim 15, further comprising:
switching the portable terminal to a near field communication mode when two touch inputs are simultaneously received on the touchscreen spaced apart by a predetermined distance, the touch inputs disposed over an icon displayed on the touchscreen representing the data; and wherein the drag operation is executed via the two touch inputs.

\* \* \* \* \*

UNITED STATES PATENT AND TRADEMARK OFFICE
CERTIFICATE OF CORRECTION

| | |
|---|---|
| PATENT NO. | : 9,007,312 B2 |
| APPLICATION NO. | : 13/342308 |
| DATED | : April 14, 2015 |
| INVENTOR(S) | : Tae-Hoon Kim et al. |

It is certified that error appears in the above-identified patent and that said Letters Patent is hereby corrected as shown below:

In the Claims

Column 11, Claim 7, Line 11 should read as follows:
--…touchscreen, wherein the drag…--

Signed and Sealed this
Twenty-first Day of July, 2015

Michelle K. Lee
*Director of the United States Patent and Trademark Office*